March 15, 1966  E. E. SKAROTT  3,240,450
AIRCRAFT
Filed April 22, 1964  2 Sheets-Sheet 1
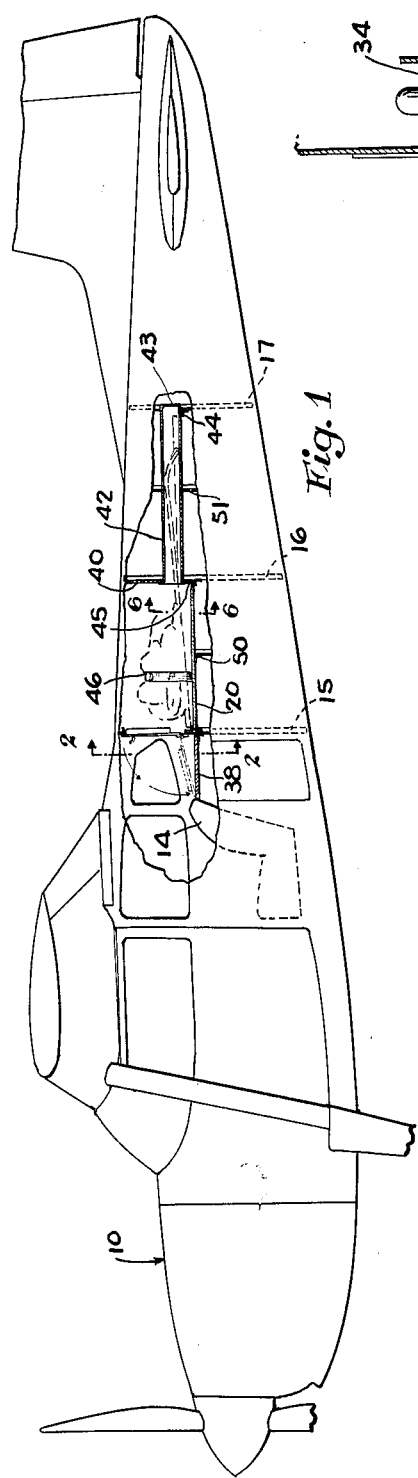
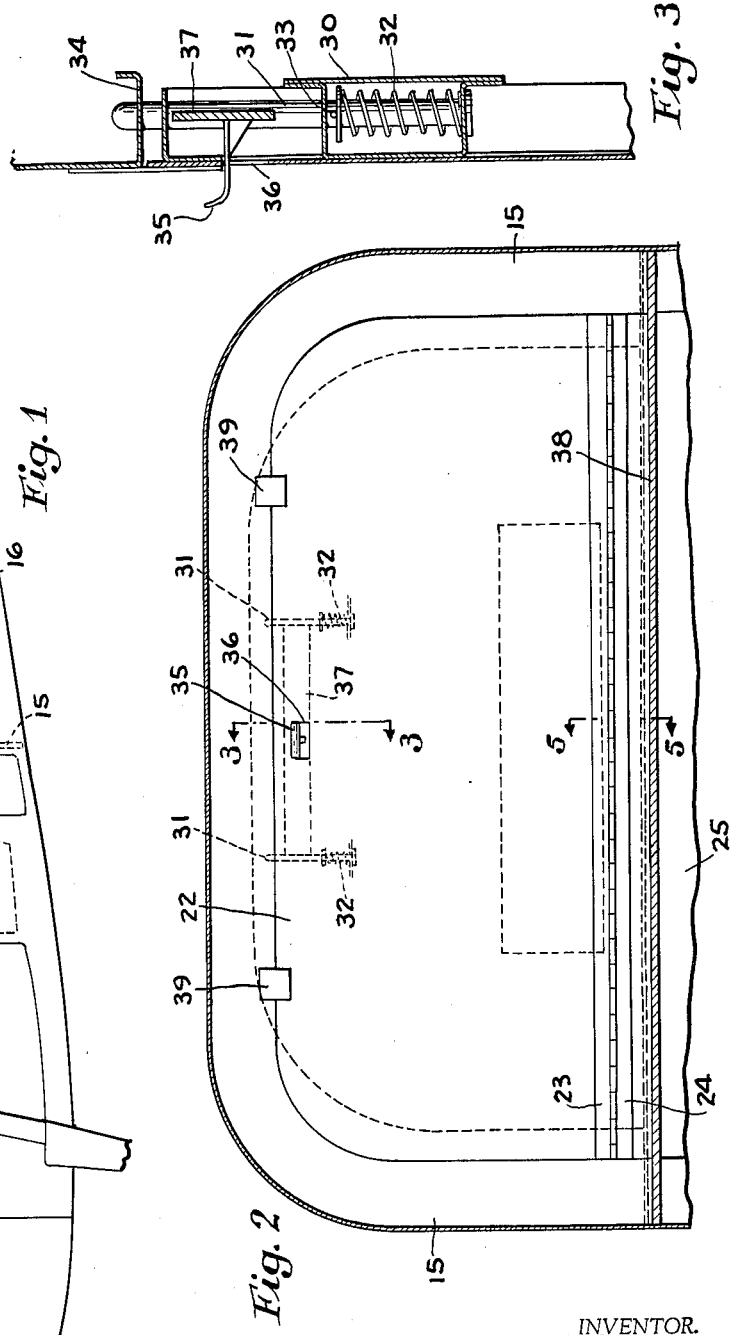
INVENTOR.
ERNEST E. SKAROTT
BY
ATTORNEY March 15, 1966  E. E. SKAROTT  3,240,450
AIRCRAFT
Filed April 22, 1964  2 Sheets-Sheet 2
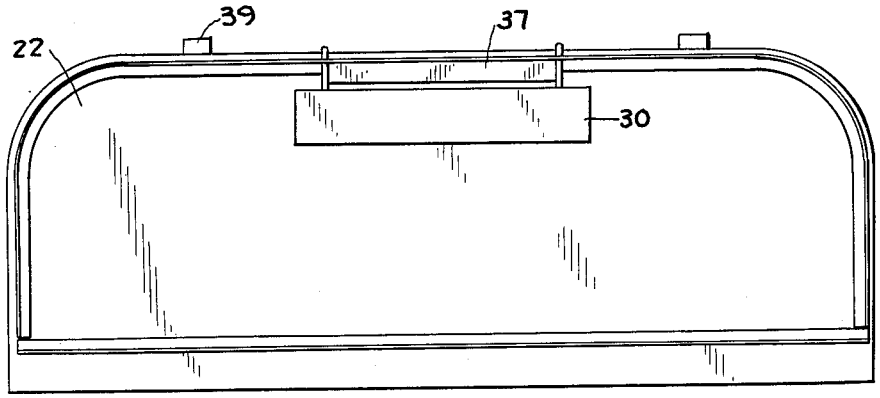
Fig. 4
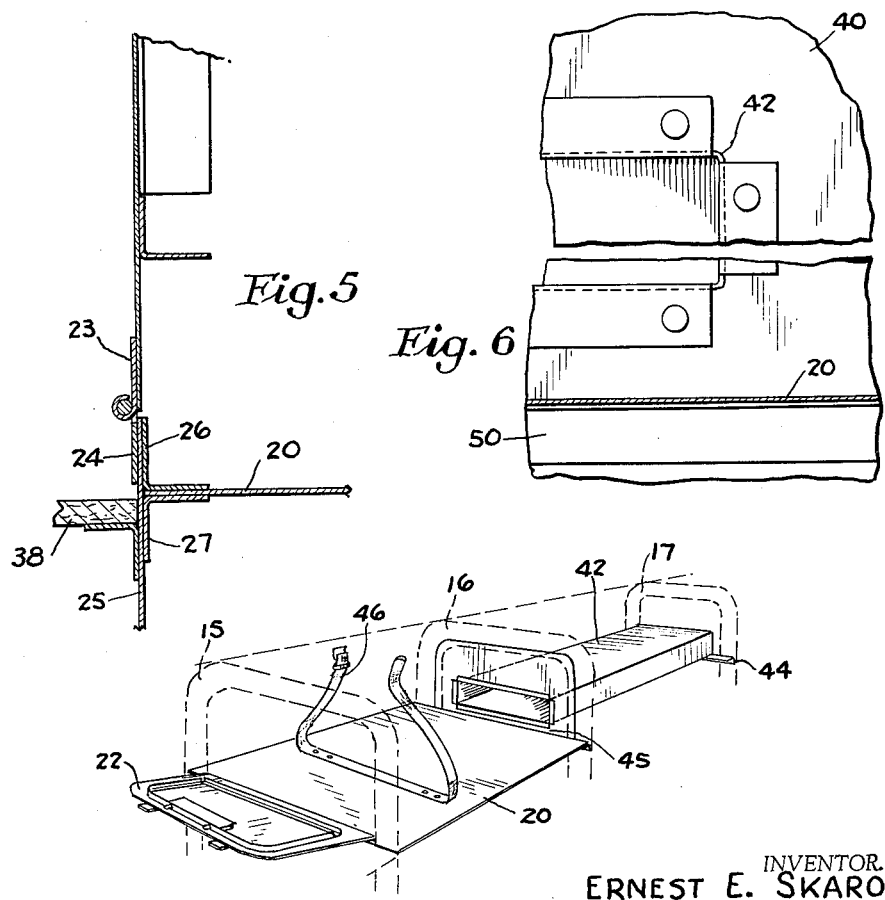
Fig. 5  Fig. 6
Fig. 7
INVENTOR.
ERNEST E. SKAROTT
BY
Gregory S. Dolgorukov
ATTORNEY United States Patent Office 3,240,450
Patented Mar. 15, 1966

3,240,450
AIRCRAFT
Ernest E. Skaroff, Rexdale, Ontario, Canada
(47 Ravina Crescent, Toronto 6, Ontario, Canada)
Filed Apr. 22, 1964, Ser. No. 361,767
8 Claims. (Cl. 244—118)

This invention relates to aircraft, particularly aircraft intended for private use, and has particular reference to an improved construction for carrying baggage therein.

Small aircraft intended for private use is extensively used for pleasure trips, such as fishing in lakes inaccessible by surface roads, and for skiing and hunting trips. For such trips it is necessary to carry fishing and hunting equipment, such as fishing rods and tackle, rifles, collapsible tents including erecting poles and the like. Skiing trips require carrying skis, poles and similar items. However, small aircraft of conventional construction has little or no provision for carrying baggage. Usually there is available for such purpose a small space on the floor of the craft immediately behind the passenger seats, but such space is suitable only for such items as suitcases and is not adequate to receive elongated articles, such as ski poles or fishing poles, collapsing tents rifles and the like.

Such articles generally are not heavy, but having them in the aircraft is not only inconvenient but may be dangerous. For instance, in case of a crash the ski poles with sharp metal end pieces and the skis themselves may go right through the front window of the craft, and may cause injury to the passengers. Fishing poles and tackle, tent canvases, be they folded or rolled on tent poles or standards, when carried in the craft by being placed on the floor of the passenger compartment, or between the backrests of the seats, or suspended at the ceiling of the aircraft, may cause the passengers to become entangled in such canvases, fishing lines or tackle in case of a crash or even during the flight in rough weather, and lead to accidents.

One of the objects of the present invention is to provide an improved aircraft whereby the above difficulties and disadvantages are overcome and large eliminated, without introducing other problems or increasing in any appreciable manner the costs involved.

Another object of the invention is to provide a small aircraft, including improved baggage receiving means capable of receiving and holding conveniently and safely elongated articles, such as those necessary on camping, fishing, hunting, or skiing trips.

A further object of the present invention is to provide a small aircraft of the nature described in the preceding paragraph, in which the advantages stated above are attained without changes in the fuselage framework of the aircraft, or without weakening the same but by utilization of presently wasted space with the means which do not weaken the aircraft but on the contrary increase its rigidity and strength.

A still further object of the present invention is to provide an improved small aircraft having improved baggage receiving means whereby elongated articles such as tents, poles, fishing poles, skis, ski poles, rifles, and the like are carried in a closed compartment, out of sight, and are securely held in position during the flight, thus preventing such articles from getting in the way of passengers in cases of a crash or a forced landing.

A still further object of the present invention is to provide a small aircraft having improved baggage receiving means provided behind the passenger seats and including a baggage supporting shelf panel forming the floor of a baggage compartment, improved means being provided to have passengers protected from forward movement of such articles stored in the compartment by a strong locked door and by front safety threshold means provided to hold the front ends of the articles liable to move forward against the safety threshold.

A still further object of the present invention is to provide a small aircraft having improved baggage supporting panels, improved means being provided to prevent small articles to roll rearwardly of the craft and become inaccessible or difficult to remove.

A still further object of the present invention is to provide an improved baggage receiving means for small aircraft which can be incorporated into the construction of the aircraft as original equipment, or which may be distributed as an attachment and installed in aircraft already in use.

Further objects and advantages of this invention will be apparent from the following description and appended claims, reference being had to the accompanying drawings forming a part of this specification, wherein like reference characters designate corresponding parts in the several views.

FIG. 1 is an elevational view of an aircraft embodying the present invention, with the portion of its side wall being broken away to show the baggage receiving means installed therein.

FIG. 2 is a fragmentary sectional view taken in the direction of the arrows on the section plane passing through the section line 2—2 of FIG. 1.

FIG. 3 is a fragmentary sectional view illustrating one of the locks provided for the purpose of locking the baggage compartment door to the frame structure of the aircraft.

FIG. 4 is an elevational view of the baggage compartment door, with the observer presumed to look from the baggage compartment forwardly, i.e. at the inside surface of the door.

FIG. 5 is a sectional view taken in the direction of the arrows on the section plane passed through the section line 5—5 of FIG. 2.

FIG. 6 is a fragmentary elevational view taken in the direction of the arrows on the section plane passed through the section line 6—6 of FIG. 1.

FIG. 7 is a perspective view showing the complete attachment in its assembled condition, with the aircraft bulkheads being indicated in phantom lines to illustrate further the space relationship of the baggage attachment to the framework of the aircraft fuselage.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there is shown by way of example, an aircraft embodying the present invention. Referring specifically to the drawings, the aircraft illustrated therein and generally indicated by the numeral 10 may be of any suitable construction belonging to the class aircraft, such as one adapted to carry two or four passengers. The aircraft comprises a suitable fuselage including a suitable framework and a shell covering the same, in a manner well known to the art. Further detailed description of the aircraft is not believed to be necessary for the purposes of the present invention, except as hereinafter done.

The rear passenger seats, such as 14 are so arranged as to have rearwardly thereof the bulkheads 15, 16, and 17. Said bulkheads 15, 16, and 17 shall be referred hereinafter as the first, second, and third bulkheads, respectively. The first bulkhead 15 is arranged at a distance, such as 15–20 inches behind the rear seat 14, or the row of such rear seats, while the bulkhead 16 is arranged at 30–35 inches rearwardly of the bulkhead 15, with the third bulkhead 17 being arranged at approximately the same distance from the bulkhead 16.

It will be understood that provision of supplemental bulkheads between the bulkheads described above does not affect the construction described below.

Between the bulk heads 15 and 16 there is provided, approximately at the level of the top of the backrest of the seat 14 or immediately below the same, a shelf panel 20 extending horizontally between said bulkheads and the side walls of the craft, and providing the floor for the baggage compartment thus formed within the section of the aircraft defined by said bulkheads 15 and 16.

At the front of the baggage compartment there is provided a door panel generally designated by the numeral 22, and having a piano hinge with the upper portion 23 thereof secured to the lower edge of said door panel 22, and the lower portion 24 of said hinge secured to the sheet 25 to which there is secured an angular transverse member 26 and 27 embracing the shelf panel 20 therebetween, as is best shown in FIG. 5. At its upper edge, the door panel 22 carries a reinforced lock plate 30 in which there is operatively mounted two locking members 31, the lower ends of which carry compression springs 32 urging said locking members upwardly by means of pins 33 for engaging the upper frame member 34 through suitable holes provided therein. A releasing handle 35 projecting outwardly through an aperture 36 is provided on a connecting plate 37 securing the locking members 31 together, as is best shown in FIGS. 2 and 3, to ensure their joint movements. The width of the aperture 36 and its position on the panel are so selected that when the springs 32 move the members 31 upwardly, the handle 35 comes in contact with the upper edge of said aperture and defines the uppermost position of said locking members 31. Door stops 39 are provided at the upper edge of the door panel 22 at the front thereof.

A shelf extension 38 may be provided in front of the baggage compartment substantially at the level of the shelf panel 20, and extend forwardly to the backrest of seat 14, and thus provide a covered space between the first bulkhead and the rear seats for suitcases and similar articles. Provision of the shelf extension 38 also provides a support for the door panel 22 in the open position thereof, as is shown in FIG. 1.

Because of the provision of the piano hinge with the axis thereof disposed at a distance above the level of the shelf panel 20, there is provided in front of the baggage compartment a raised threshold which is substantially coextensive with the upper bar of the angular member 26, and serves as a stop for various articles stored in the passenger compartments, should the same move forwardly by inertia.

To form the back wall of the baggage compartment there is provided at the rear edge of the shelf panel 20 a partition 40 fitted into the space between the panel 20 and the upper portion of the second bulkhead 16. The partition 40 is secured to the bulkhead 16 in any suitable manner, such as by riveting or with the aid of small bolts.

In accordance with the invention, there is provided in the partition 40 an elongated opening or aperture into which is fitted the open front end of a chute 42. The rear end of said chute 42 is closed, as indicated at 43, and secured to a cross-member 44, the ends of which are in turn secured to the third bulkhead 17.

It will be noted that the aperture which receives the open front end of the chute 42 is provided in the partition 40 at a distance above the level of the shelf panel 20 in order to provide a rear raised threshold 45, and thus to prevent small articles from rolling or otherwise getting into the chute and become difficult to reach or to remove. If desired, the rear end of the chute 42 may be raised for a small distance, such as two or three inches as compared with its front end in order to permit elongated articles to assume forwardly inclined positions and thus to insure that the front ends thereof abut at the front threshold formed by the angular member 26, rather than at the door panel. Such a result is further insured by the provision of a baggage tying strap 46 extending transversely of the shelf panel 20 with its ends adapted to be connected together with the use of a suitable buckle provided on one of said ends to extend over the articles contained in the baggage compartment, and to hold them down. Articles such as blankets, tent canvases, and the like may be placed over various elongated articles, such as rifles, poles, and the like and thus provide convenient and safe storage thereof in flight.

The door panel 22, the shelf panel 20, the partition 40, and the chute 42 are made, preferably of sheet aluminum. To add rigidity to the shelf 20 and the chute 42, supports 50 and 51 may be provided underneath the same. The shelf extension 38 may be made of plywood or a similar material.

The baggage receiving construction described above provides for much greater convenience in flight and can safely carry as much as thirty pounds, and fully satisfy the safety requirements usually prescribed for an aircraft of this particular size and nature.

It will be understood that the above described baggage receiving construction may be incorporated into the construction of an aircraft in the process of its manufacturing, or it may be supplied in the form of an attachment for installation in an aircraft already in use. Such an attachment, suitable for an aircraft of the size indicated above by way of example, weighs including its connecting parts such as bolts and the like, approximately seven pounds and may be conveniently distributed in a knocked-down condition, packaged in a small carton such as 35 x 35 x 8 inches.

By virtue of the above disclosed construction, the objects of the present invention listed above and numerous additional advantages are attained.

I claim:

1. In an aircraft including seats with backrests and at least three fuselage bulkheads disposed rearwardly of said seats at a distance from thirty inches to thirty-five inches from each other and defining two rear sections of the fuselage in a tandem arrangement, a horizontally extending shelf disposed immediately below the tops of the backrests of said seats to form the floor of a baggage compartment thus formed in the upper portion of the forwardmost section, a hinged door fitted into the first bulkhead to form in its closed position the front wall of said baggage compartment and to provide in its open position an opening for loading the baggage compartment, a lock for locking said door to its bulkhead, a raised threshold along the bottom edge of said door providing a front safety abutment for the article received by the baggage compartment, a transverse partition fitted to the second bulkhead to form the back wall of said baggage compartment.

2. The construction defined in claim 1, with the door being hinged along its bottom edge, with the hinge thereof forming a part of the safety threshold.

3. The construction defined in claim 1 and including a tying strap operatively mounted in said compartment to extend in the tied condition transversely thereof and to press the front ends of elongated articles carried by said compartment against the floor thereof to insure said ends to come in contact with said threshold if moved forwardly.

4. In an aircraft including seats with backrests at least three bulkheads forming portions of the fuselage framework and disposed behind said seats in a tandem arrangement at a distance of 30–35 inches from each other, a horizontal shelf disposed immediately below the top of the backrests of said seats to form the floor of a baggage compartment thus formed in the upper portion of the section between the first and the second bulkheads, a door fitted into the opening of the first bulkhead to form in its closed position the front wall of said baggage compartment and to provide in its open position an opening for loading said baggage compartment, a transverse partition fitted to the second bulkhead to form the back wall of said baggage compartment, said partition being provided in its lower portion with an opening, an elongated chute having its front end fitted into said partition opening and its rear end closed, said chute extending rearwardly from said partition substantially through the entire length of the second section and adapted to receive the rear ends of said elongated articles.

5. The construction defined in claim 4, with the bottom edge of the opening in the partition being disposed at a distance from the floor of the baggage compartment to provide a raised threshold at said chute operative to prevent rolling of small articles from the baggage compartment into the chute.

6. The construction defined in claim 4, with the rear end of the chute being raised.

7. A baggage attachment for an aircraft including a plurality of seats and at least three bulkheads forming portions of the fuselage framework and disposed behind the seats in a tandem arrangement, a shelf panel adapted in its installed position to extend horizontally between the first and the second bulkheads and the side walls of the aircraft and to form the floor of a baggage compartment therebetween, a hinged door panel adapted to be fitted into the space between said shelf panel and the portion of the first bulkhead above said panel to form in its closed position the front wall of the baggage compartment and to provide for selectively opening and closing the same, locking means for locking said door panel in its closed position to the framework of the craft, a partition panel adapted to be fitted into the space between the shelf panel and the portion of the second bulkhead above said panel to close the same and to form the back wall of the baggage compartment, said partition panel having provided therein an opening, a chute having its front end open and fitted into the opening provided in the partition panel and extending rearwardly toward the third bulkhead.

8. A baggage attachment for an aircraft including a plurality of seats and at least three bulkheads forming portions of the fuselage framework and disposed behind the seats in a tandem arrangement, a shelf panel adapted in its installed position to extend horizontally between the first and the second bulkheads and the side walls of the aircraft and to form the floor of a baggage compartment therebetween, a hinged door panel adapted to be fitted into the space between said shelf panel and the portion of the first bulkhead above said panel to form in its closed position the front wall of the baggage compartment and to provide for selectively opening and closing the same, locking means for locking said door panel in its closed position to the framework of the craft, a partition panel adapted to be fitted into the space between the floor panel and the portion of the second bulkhead above said panel to close the same and to form the back wall of the baggage compartment, said partition panel having an opening provided therein at a distance from the floor panel sufficient to provide a raised threshold, a chute having its front end open and fitted into said opening and its rear end closed, said chute adapted in its installed position to extend between said partition panel and the third bulkhead of the aircraft.

References Cited by the Examiner

UNITED STATES PATENTS 2,511,877  6/1950  Protzeller _____ 244—118 X

FOREIGN PATENTS 622,678  3/1927  France.

MILTON BUCHLER, *Primary Examiner.*

ALFRED E. CORRIGAN, *Examiner.*